Sept. 20, 1971   R. K. CARLSON   3,606,065
CAMERA ENCLOSURE
Filed Sept. 2, 1969
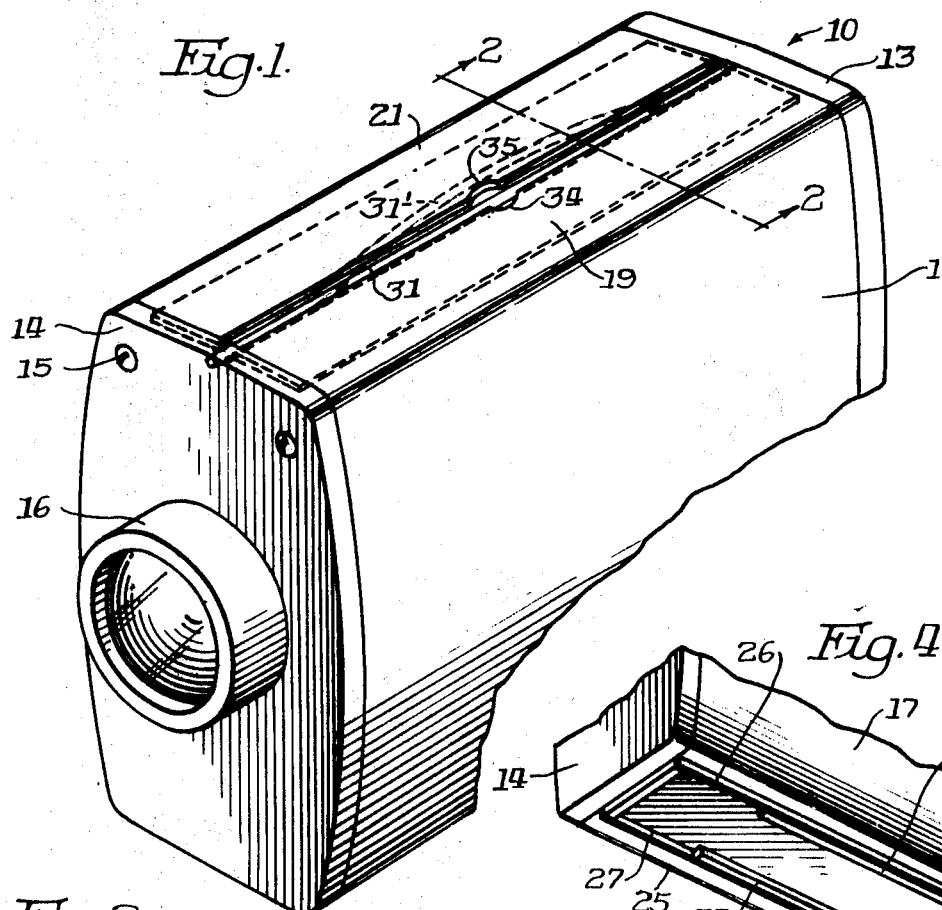
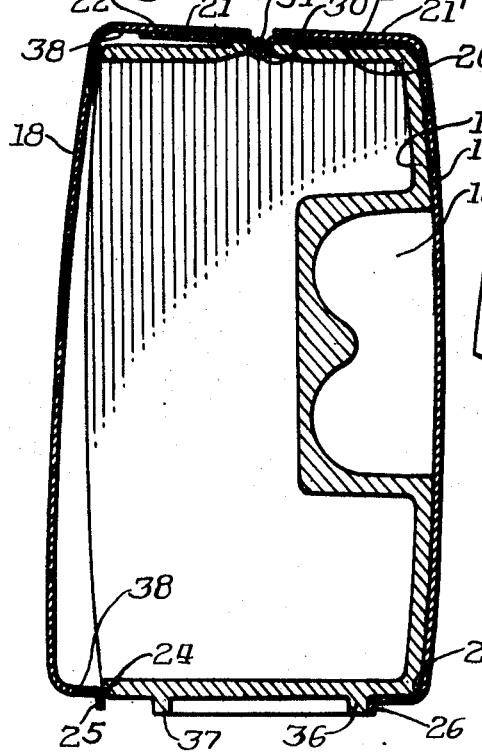
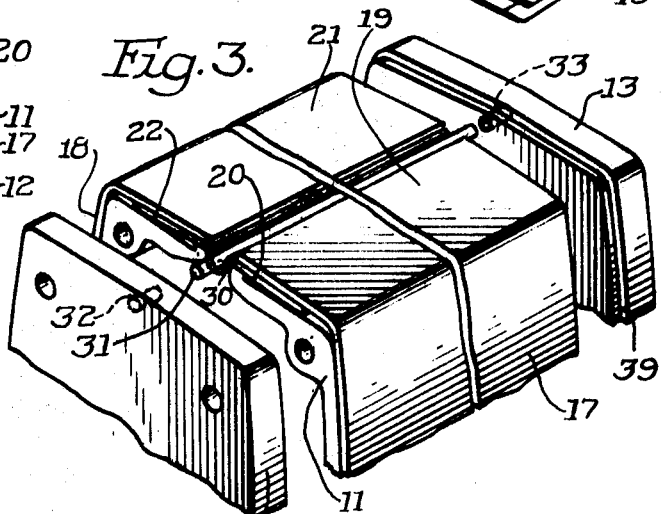
Inventor:
Richard K. Carlson
By William F. Pinsak Atty

United States Patent Office 3,606,065
Patented Sept. 20, 1971

3,606,065
CAMERA ENCLOSURE
Richard K. Carlson, Chicago, Ill., assignor to Bell &
Howell Company, Chicago, Ill.
Filed Sept. 2, 1969, Ser. No. 854,487
Int. Cl. B65d 7/12; G03b 17/02
U.S. Cl. 220—4R                6 Claims

ABSTRACT OF THE DISCLOSURE

This invention consists of an enclosure which is of shell-like or tubular formation, being of polygonal cross-section and open at its ends in order to fit compatibly about a body member or mechanism having shouldered portions around the body. The enclosure is provided with a hinge on one part of its surfaces, and resilient lips on another part thereof to releasably engage the body member.

---

This invention relates to enclosurees adapted to compatibly fit about a body and particularly about the body of a battery powered movie camera.

Known enclosures for cameras have only one hinged cover for access to a portion of one side of the camera body. For battery powered movie cameras, this cover portion must be sufficiently large to have access for a film cartridge and for the batteries which results in an excessively large and bulky camera.

A further disadvantage of the known one-hinged cover is the method of locking the cover in a closed position. The method commonly used is accomplished by sliding or rotatable mechanisms which are costly and add undesirable excess weight to the camera.

It is an object of this invention to provide an enclosure for a compact camera which can be attached to, and removed from, a body member quickly and readily.

It is another object of this invention to provide an enclosure for a compact camera having two independently operable hinged covers, one to provide access for a film cartridge on one side of the camera and the other to provide access for the batteries on the opposite side of the camera.

It is another object of this invention to provide hinge means formed by two edges in abutting relationship and secured by flexible means.

It is another object of this invention to provide snap engaging means in opposed relationship to said hinge means.

It is a further object of this invention to provide co-operating locking edges on said body member operating in concert with the resiliency inherent in said shell structure resulting in a releasable spring-tensioned clamping action.

Further and other objects will be apparent from the description of the accompanying drawings, in which like numerals relate to like parts.

In the drawings:

FIG. 1 is a perspective view depicting the invention enclosing a body, in this instance a camera, with a portion thereof being broken away.

FIG. 2 is a transverse cross-sectional view of FIG. 1 taken along the lines 2—2 of FIG. 1.

FIG. 3 is an exploded fragmentary view in perspective, showing the component elements of the novel hinge structure embraced in the instant invention.

FIG. 4 is a fragmentary bottom perspective view at a reduced scale.

Referring to the various views, the invention is generally designated 10 and consists of a "wrap around" shell-like, or tubular structure made up of two C-shaped elements 17 and 18, each one covering one side of the camera and each provided with abutting portions 19 and 21 respectively, and engaging lip portions 25 and 26. The lip portions 25 and 26 engage the edges 23 and 24 in snap-on and snap-off relationship by virtue of the resilience inherent in the material from which the enclosure is produced, which may be metal, plastic or any other suitable material. The ledges 36 and 37 form the base for body 11 and provides stops for lips 25 and 26, and are cut away as shown in FIG. 4 to provide finger clearance 27 for grasping lips 25 and 26. Said enclosure 10 may be of any polygonal cross-sectional configuration, even circular, dependent on the circumstances and shape of a body member which it is to enclose.

The body 11 of the camera is provided with a housing 12 for receiving batteries for operating the camera mechanism and a lens 16.

Referring to FIGS. 1, 2 and 3, it should be noted that the camera body 11 is provided with a cradling recess 30 to accommodate the hinge axis 31 which may be sprung into and out of engagement as shown in FIG. 1. That is to say, the hinge axis 31 may be sprung as shown by dotted lines 31'. Clearance cuts 34 and 35 may be utilized to facilitate insertion of any suitable instrumentality for prying up the axis 31 as shown at 31'. It should be noted that the end plates 13 and 14 of the body are secured by screws 15 or any other fastenings found desirable. It is the purpose of blind bores 32 and 33 to retain the hinge axis 31 in operative assembly. The hinge structure includes a flexible element 20 having portions 22 and 22' secured to hinge abutments 21 and 21'. The flexible element 20 is preferably a tape provided with a thermo-setting coating necessitating the use of heat to cause the portions 22 and 22' thereof to adhere to the shell sections 18 and 17. Any ordinary tape may be employed and any adhesive which would bond the tape to metal or to any other material which may be employed.

The snap means operative efficiency is effected by the resilienc of the C sections as well as by virtue of the space 38 confined between upper and lower portions causing snap-on locking as seen by comparison of right and left portions 25 and 26 as shown at bottom of FIG. 2.

Referring particularly to FIGS. 2 and 3, the enclosure 10 is placed over the body 11 by locating it in shoulders 29 of end plates 13 and 14, snapping bottom lips 25 and 26 over edges 24 and 23, and then inserting hinge axis 31.

The enclosure 10 may be removed from the camera body 11 by removing the hinge axis 31, snap-off lips 25 and 26 from edges 24 and 23 and lifting the enclosure therefrom.

What is claimed is:

1. A body enclosure means comprising: a shell-like structure open at both ends; hinge means longitudinally disposed on said structure includes edges positioned in abutting arrangement, a flexible element secured to said edges and forming a cradle portion and a hinge axis element confined removably in said cradle portion and provided with extensions adapted to be anchored in a member to which said enclosure may be attached; and snap locking means disposed in opposed relationship to said hinge means.

2. A body enclosure means comprising: a shell-like structure open at both ends; hinge means longitudinally disposed on said structure including a pair of edges positioned in abutting relationship, a flexible element securing said edges confining a cradle portion therebetween, and an axis element positioned in said cradle portion and provided with extensions adapted to be anchored in a body to which said engirding enclosure means may be assembled; and snap locking means disposed in opposed relationship to said hinge means.

3. A body enclosure means comprising: a shell-like structure open at both ends; hinge means longitudinally disposed on said structure;
a pair of edges positioned in abutting relationship, a flexible element securing said edges by means of a thermo-setting adhesive confining a cradle portion therebetween, and an axis element positioned in said cradle portion and provided with extensions adapted to be anchored in a body to which said engirding enclosure means may be assembled; and
snap locking means disposed in opposed relationship to said hinge means.

4. An enclosure means as defined in claim 3 in which said snap locking means includes lip portions on said shell-like structure resiliently engaging the body.

5. An enclosure means comprising:
a tubular shell-like structure open at both ends, said ends being of polygonal cross-sectional configuration;
hinge means longitudinally disposed on said tubular structure;
snap locking means disposed in opposed relationship to said hinge means;
body means provided with end portions of like cross-sectional configuration and shoulder portions to receive said ends in abutting and flush relationship when assembled to said enclosure means;
said hinge means including edges positioned in abutting arrangement;
a flexible element securing said edges and forming a cradle portion; and
a hinge axis element confined removably in said cradle portion and provided with extensions adapted to be anchored in a member to which said enclosure may be attached.

6. An enclosure means comprising:
a tubular shell-like structure open at both ends, said ends being of polygonal cross-sectional configuration;
hinge means longitudinally disposed on said tubular structure;
snap locking means disposed in opposed relationship to said hinge means;
body means provided with end portions of like cross-sectional configuration and shoulder portions to receive said ends in abutting and flush relationships when assembled to said enclosure means;
said hinge means including edges including edges positioned in abutting arrangement;
a flexible element securing said edges and forming a cradle portion; and
a hinge axis element confined removably in said cradle portion and provided with extensions adapted to be anchored in a member to which said enclosure may be attached;
said releasable snap-locking means consisting of lip portions formed on said enclosure means made so as to engage resiliently edges of said body means.

References Cited

UNITED STATES PATENTS

| | | | |
|---|---|---|---|
| 3,289,085 | 11/1966 | Leland | 220—31SRX |
| 3,416,852 | 12/1968 | Goldbeck | 220—31SRX |
| 3,519,162 | 7/1970 | Peterson | 220—4 |

FOREIGN PATENTS

| | | | |
|---|---|---|---|
| 1,141,175 | 12/1962 | Germany | 220—31SR |

GEORGE E. LOWRANCE, Primary Examiner

U.S. Cl. X.R.

95—11; 220—31S